US009523985B1

(12) United States Patent
Barnes et al.

(10) Patent No.: US 9,523,985 B1
(45) Date of Patent: Dec. 20, 2016

(54) REAL TIME AND IN-FLIGHT DYNAMIC PERSONALIZATION OF AN AIRCRAFT

(75) Inventors: Geoffrey J. Barnes, Cedar Rapids, IA (US); Stephen J. Timm, Marion, IA (US); Bryan R. Vester, Cedar Rapids, IA (US); Charles B. Dirks, Swisher, IA (US); Richard G. Moore, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1175 days.

(21) Appl. No.: 12/462,895

(22) Filed: Aug. 11, 2009

(51) Int. Cl.
*G05D 1/06* (2006.01)
*B64D 43/00* (2006.01)
*B64D 45/00* (2006.01)

(52) U.S. Cl.
CPC .............. *G05D 1/0653* (2013.01); *B64D 43/00* (2013.01); *B64D 45/0005* (2013.01); *G05D 1/0661* (2013.01)

(58) Field of Classification Search
CPC ... B64D 43/00; B64D 45/0005; G05D 1/0653; G05D 1/0661; G01C 23/00; G08G 5/0021; G06F 17/30861; H04L 67/12; H04H 20/62
See application file for complete search history.

(56) References Cited

U.S. PATENT DOCUMENTS

| | | | |
|---|---|---|---|
| 5,945,988 A | 8/1999 | Williams et al. | |
| 5,977,964 A | 11/1999 | Williams et al. | |
| 6,199,762 B1 | 3/2001 | Hohle | |
| 6,272,467 B1 | 8/2001 | Durand et al. | |
| 6,775,603 B2 * | 8/2004 | Yester et al. | 701/36 |
| 6,785,595 B2 * | 8/2004 | Kominami et al. | 701/36 |
| 6,895,406 B2 | 5/2005 | Fables et al. | |
| 7,139,660 B2 * | 11/2006 | Sarkar et al. | 701/36 |
| 7,188,005 B2 * | 3/2007 | Toba et al. | 701/1 |
| 7,191,406 B1 * | 3/2007 | Barber et al. | 715/771 |
| 7,483,772 B2 * | 1/2009 | Oesterling et al. | 701/2 |
| 7,567,186 B2 * | 7/2009 | Endress et al. | 340/945 |
| 2005/0278753 A1 * | 12/2005 | Brady et al. | 725/76 |
| 2006/0180647 A1 * | 8/2006 | Hansen | 235/375 |
| 2006/0184253 A1 * | 8/2006 | Andrews et al. | 700/17 |
| 2007/0143482 A1 * | 6/2007 | Zancho | 709/227 |
| 2009/0144622 A1 * | 6/2009 | Evans et al. | 715/706 |
| 2010/0036560 A1 * | 2/2010 | Wright et al. | 701/36 |

* cited by examiner

*Primary Examiner* — Bao Long T Nguyen
(74) *Attorney, Agent, or Firm* — Angel N. Gerdzhikov; Donna P. Suchy; Daniel M. Barbieri

(57) ABSTRACT

A method and system for dynamically personalizing an aircraft is provided. Users of an aircraft store their environmental preferences in a file on a storage device. When the users use the aircraft or ride on the aircraft, the aircraft computer system communicates with and uploads the users' files containing the users' environmental preferences. The aircraft computer system then implements the users' preferences by configuring a system of modules.

14 Claims, 1 Drawing Sheet

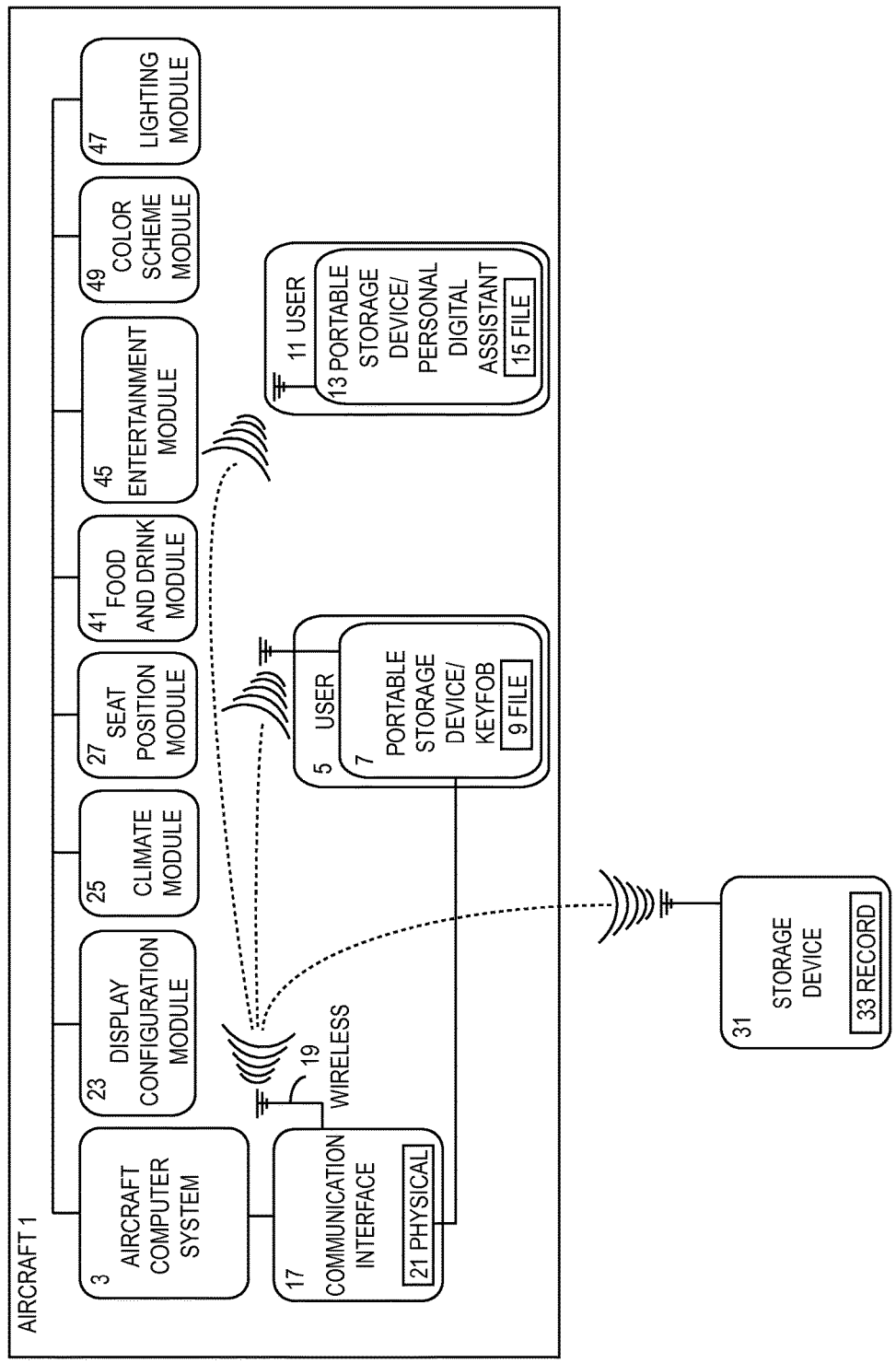

REAL TIME AND IN-FLIGHT DYNAMIC PERSONALIZATION OF AN AIRCRAFT

BACKGROUND OF THE INVENTION

Field of the Invention

The present invention relates to the field of personalizing in real time during operation of an aircraft, and, in particular, to a method and system for real time dynamically personalizing and configuring an aircraft user environment based on the user's preferences. Background Users of aircraft, whether the users are the passengers, flight crew, or pilots, want their experiences tailored to meet their preferences while riding in or flying the aircraft. Presently, aircraft do not have the ability to customize themselves, in real time, to meet the differences in preferences among different pilots who fly the aircraft, among different flight crews, or among different passengers, or the ability to dynamically change the user environment during different phases of the flight as the users' preferences change throughout the flight. For example, pilots often have differences in how they want the displays positioned, oriented and colored in the cockpit, and those preferences may change depending on the phase of the flight. Passengers often have differences in how they want their lighting configured, temperature set, their video entertainment options, and their food and drink served. These preferences are often lost when another user either accesses the equipment or requires configuration files to be stored and managed somewhere on the platform. Oftentimes the amount of configurability is limited (even though the aircraft computer system has more capability) either because of the time it takes to configure, the availability of storage for the configuration files or the complexity of management.

The present invention solves these problems by configuring and customizing the aircraft to meet the preferences of the pilots, flight crew, and/or passengers. The present invention customizes the flight deck and cabin configurations to align with the personal desires, needs or requirements of the various users of the aircraft, and can reconfigure the users' environment as the users' preferences change during the different phases of the flight.

The present invention, therefore, saves time for the flight crew because the environmental preferences for the passengers will automatically be configured and/or known to the flight crew without requiring the passengers to make requests to the flight crew.

The present invention, therefore, saves time for the pilots and improves their experience with the aircraft because the environmental preferences for the pilots will be configured when the pilots enter the cockpit and will be tailored to meet the pilots' preferences.

The present invention will improve the experience of the passengers of the aircraft because the aircraft environment will be tailored to the preferences of the passengers of the aircraft.

SUMMARY OF THE INVENTION

The present invention generally comprises a method for dynamically personalizing an aircraft environment, comprising storing a first plurality of user environmental variables on a first portable storage device corresponding to the preferences of a first user; storing a second plurality of user environmental variables on a second portable storage device corresponding to the preferences of a second user; communicating the first and second plurality of user environmental variables from the first and second portable storage devices to an aircraft computer system; determining the phase of flight of the aircraft; identifying the identity of the first and second users; determining the relative priority between the first and second plurality of user environmental variables based on the identities of the first and second users; and configuring the aircraft environment in accordance with the plurality of user environmental variables that have the highest priority and in accordance with the phase of flight.

In another aspect, the present invention comprises a dynamic personalization method for customization of an aircraft environment, comprising identifying a user of an aircraft; storing a plurality of user environmental variables corresponding to the user on a storage device; communicating the plurality of user environmental variables from the storage device to an aircraft computer system; and configuring the aircraft environment in accordance with the plurality of user environmental variables.

In another aspect, the present invention comprises a system for customization of an aircraft environment, comprising a plurality of user environmental variables corresponding to a user of an aircraft; a record storing the plurality of user environmental variables on a storage device; a computer system on the aircraft capable of implementing the user environmental variables; and a wireless communication network in communication with the storage device and the computer system for sending the record to the computer system.

BRIEF DESCRIPTION OF THE DRAWINGS

FIG. 1 is a schematic overview of an exemplary dynamic personalization system in accordance with various aspects of the present invention.

DETAILED DESCRIPTION OF THE PREFERRED EMBODIMENTS

It is not intended that the present invention be limited to the described embodiments. It is intended that the invention cover all modifications and alternatives which may be included within the spirit and scope of the invention.

Various aspects of the present invention are illustrated in FIG. 1. In one embodiment, an aircraft 1, such as a commercial or private aircraft, can be dynamically personalized as follows. A user 5, such as a pilot, passenger, crew member, or other individual who interacts with the aircraft, can carry a portable storage device 7, such as a personal digital assistant, a key fob, or other similar device. In the portable storage device 7, the user 5 stores a file 9 that contains the user's preferred user environmental variables, which can also be referred to as the user's profile. Such variables can include the user's preferences regarding flight deck display menu configurations, such as the positions of displays, orientation of displays, and/or colors of displays; seat positions; lighting conditions; climate conditions such as air temperature and airflow; color schemes; entertainment preferences such as volume settings, video entertainment, movie entertainment, television entertainment, websites, stock quotes and/or reading content; food; drink; and other similar variables. The file 9 can also contain information about the user 5 such as the user's identity, job title, employer, and other personal information. The user's file 9 can be stored in a standard defined file format that is compatible with and readable by the aircraft's computer system 3. By using a standard file format, the aircraft computer system 3 can read a user's file 9 regardless of what type of portable storage device 7 the user's file 9 is stored on. The standard file format would be defined by the vendor as a common data structure used across multiple applications.

When the user 5 is scheduled to fly on or operate the aircraft, the user's file 9 can be uploaded and communicated to the aircraft computer system 3 via a communication interface 17 that is in communication with the aircraft computer system 3. The aircraft computer system 3 can access the user's file 9 upon command or according to predetermined criteria, such as upon the provision of the crew list, passenger list, or the phase of flight. The user's file 9 can be communicated to the aircraft's computer system 3 via wireless communication 19 on the communication interface 17 if the user's portable storage device 7 has wireless communication ability. Alternatively, the user's file 9 can be communicated to the aircraft's computer system 3 via connection through a physical port 21 on the communication interface 17. The physical port 21 could be a USB port or any other well-known physical port connection. The wireless communication could comprise radio frequency identification (RFID), key fob, blue tooth, 802.11, or other established wireless communication methods.

In another embodiment, the file 9 can be stored as a record 33 on a storage device 31 that is remote from the aircraft 1 and the user 5. The storage device 31 could be a network device such as a smart phone, wireless capable netbook, wireless capable computer, or a dedicated wireless fob device specifically sold for this task. The storage device 31 can then communicate the record 33 via a wireless communication network to the communication interface 17.

After the user's file 9 is communicated to the aircraft's computer system 3, the aircraft's computer system 3 can then configure the user's user environment in accordance with the user's file 9 by making the appropriate adjustments to the applicable systems of the aircraft. For example, the aircraft computer system 3 can implement the user's flight deck display menu configurations by communicating with and configuring the display configuration module 23, which may contain the user's preferences for positions of the displays, orientation of the displays, and colors of the displays. The aircraft computer system 3 can implement the user's preferences for seat positions by communicating with and configuring the seat position module 27. The aircraft computer system 3 can implement the user's preferences for lighting conditions by communicating with and configuring the lighting module 47. The aircraft computer system 3 can implement the user's preferences for climate conditions such as air temperature and airflow by communicating with and configuring the climate module 25. The aircraft computer system 3 can implement the user's preferences for color schemes by communicating with and configuring the color scheme module 49. The aircraft computer system 3 can implement the user's entertainment preferences such as volume settings, video entertainment, movie entertainment, television entertainment, websites, stock quotes and/or reading content by communicating with and configuring the entertainment module 45. The aircraft computer system 3 can implement the user's preferences for food and drink by communicating with and configuring the food and drink module 41. As can readily be seen, the preferences in the file 9 can be implemented to the applicable module by the aircraft computer system 3. The foregoing list is only intended to highlight a few examples of preferences that may be implemented. The receiving device would decode the personal preferences and set the definable interface and control parameters to match the personal preferences.

Oftentimes, there are multiple users present on the aircraft, such as user 5 and user 11. Users 5 and 11 could be two different pilots or two different passengers. In one embodiment, the aircraft computer system 3 identifies the identity and relative rank of users 5 and 11 and prioritizes the settings of the aircraft environment in accordance with the user who receives higher priority. For example, users 5 and 11 could be the captain and co-captain, respectively, of the aircraft; or the chief executive officer and a lower ranking employee of a company, respectively; or a first class passenger and an economy class passenger, respectively, of the aircraft. In such a situation, computer system 3 identifies the higher ranking user (such as the captain, chief executive officer, or first class passenger in the examples in the preceding sentence) by reading and comparing the files 9 and 15 of the users 5 and 11. The aircraft computer system 3 then configures the aircraft environment in accordance with the higher ranking user's preferences if the higher ranking user's preferences and the lower ranking user's preferences are in conflict and if the aircraft 1 is not equipped to accommodate the preferences of both users. One example could include the climate conditions of the aircraft if the aircraft is not equipped to accommodate the preferences of both users 5 and 11. Another example could include the display configurations of the flight deck if the flight deck is not equipped to accommodate the preferences of both the captain and the co-captain.

In another aspect of the invention, the files 9 and 15 contain the users 5 and 11, respectively, preferences for different phases of the flight, such as for pre-takeoff, takeoff, flight, landing, and post-landing. After the aircraft computer system 3 reads the files 9 and 15 from the portable storage devices 7 and 13 using communication interface 17, the aircraft computer system 3 can accordingly update and implement the preferences of the users 5 and 11 as the phase of flight changes by reconfiguring the appropriate modules, such as display configuration module 23, climate module 25, seat position module 27, food and drink module 41, entertainment module 45, lighting module 47, color scheme module 49, and any other modules which the aircraft computer system 3 is controlling.

A user's preferences may depend upon the nature of the flight, duration, and whether or not international travel is involved. For example, a user may prefer the lighting, temperature or airflow around the seat to automatically change over time during the last few hours of a long international flight when the user may be sleeping. Some users may prefer to have the aircraft aid in furthering their sleep while others may prefer to have the lights turn on, airflow increase, and/or temperature change as a way of waking up.

Preferences of the users 5 and 11 may change during their experience on the aircraft. In another aspect of the invention, the aircraft computer system 3 periodically reads the files 9 and 15 or the record 33 to monitor for changes in the preferences of the users 5 and 11. If the aircraft computer system 3 detects a change in the user's preferences, then the aircraft computer system 3 can update and reconfigure the applicable module.

A general description of the present invention, as well as a preferred embodiment of the present invention, have been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A method, executed by an aircraft computer system, for dynamically personalizing an aircraft environment, comprising:
storing a first plurality of user environmental variables on a first portable storage device corresponding to preferences of a first user, the first user being a pilot of an aircraft;
communicating the first plurality of user environmental variables from the first portable storage devices to the aircraft computer system;
determining a phase of flight of the aircraft, the phase of the flight including one of pre-takeoff, takeoff, flight, landing, or post-landing;
effecting a transformation of an aircraft environment in accordance with the plurality of user environmental variables and in accordance with the phase of flight;
wherein said step of effecting a transformation of an aircraft environment comprises effecting a transformation of
aircraft seat position;
display position;
display color; and
display orientation.

2. The method of claim 1 wherein the first portable storage device includes a personal digital assistant.

3. The method of claim 1 wherein the first portable storage device includes a key fob.

4. The method of claim 1, wherein said step of effecting a transformation of an aircraft environment comprises effecting a transformation further includes:
aircraft cabin ambient lighting;
aircraft cabin air temperature; and
aircraft cabin airflow.

5. A dynamic personalization method, executed by an aircraft computer system, for customization of an aircraft environment, comprising:
identifying a user of an aircraft;
storing a plurality of user environmental variables corresponding to the user on a storage device;
determining a phase of flight of the aircraft, the phase of the flight including one of pre-takeoff, takeoff, flight, landing, or post-landing;
communicating the plurality of user environmental variables from the storage device to the aircraft computer system; and
effecting a transformation of an aircraft environment in accordance with the plurality of user environmental variables and the phase of the flight;
wherein said step of effecting a transformation of an aircraft environment comprises effecting a transformation of:
aircraft seat position;
aircraft cabin ambient lighting;
aircraft cabin air temperature;
display position;
display color; and
display orientation.

6. The method of claim 5 wherein the storage device is portable.

7. The method of claim 6 wherein the storage device is a key fob.

8. The method of claim 6 wherein the storage device is a personal digital assistant.

9. The method of claim 5 wherein the storage device is a network device connected to a wireless communication network.

10. A system for customization of an aircraft environment, comprising:
a plurality of user environmental variables corresponding to a user of an aircraft wherein said plurality of user environmental variables comprises:
aircraft seat position;
aircraft cabin ambient lighting;
aircraft cabin air temperature;
aircraft cabin airflow;
display position;
display color; and
display orientation
a record storing the plurality of user environmental variables on a storage device;
a computer system on the aircraft implementing the user environmental variables, depending upon a phase of flight of the aircraft, the phase of the flight including one of pre-takeoff, takeoff, flight, landing, or post-landing; and
a wireless communication network in communication with the storage device and the computer system for sending the record to the computer system.

11. The system of claim 10 wherein the storage device is portable.

12. The system of claim 11 wherein the storage device is a key fob.

13. The system of claim 11 wherein the storage device is a personal digital assistant.

14. The system of claim 10 wherein the storage device is a network device connected to the wireless communication network.

* * * * *